US010114395B2

United States Patent
Dawley et al.

(10) Patent No.: US 10,114,395 B2
(45) Date of Patent: Oct. 30, 2018

(54) EXPERT SYSTEM ANALYSIS FOR POWER MONITORING DEVICES

(71) Applicant: Electronic Systems Protection, Inc., Knightdale, NC (US)

(72) Inventors: Robert A Dawley, Clayton, NC (US); Richard J Billingsley, British Columbia (CA); David Perrotta, Youngsville, NC (US)

(73) Assignee: Electronic Systems Protection, Inc., Knightdale, NC (US)

( * ) Notice: Subject to any disclaimer, the term of this patent is extended or adjusted under 35 U.S.C. 154(b) by 371 days.

(21) Appl. No.: 14/933,632

(22) Filed: Nov. 5, 2015

(65) Prior Publication Data

US 2017/0131732 A1    May 11, 2017

(51) Int. Cl.
*G05B 15/02*    (2006.01)
*G05F 1/66*    (2006.01)

(52) U.S. Cl.
CPC .............. *G05F 1/66* (2013.01); *G05B 15/02* (2013.01)

(58) Field of Classification Search
CPC combination set(s) only.
See application file for complete search history.

(56) References Cited

U.S. PATENT DOCUMENTS

| 5,107,497 | A  |    | 4/1992  | Lirov et al. |
| 5,353,384 | A  |    | 10/1994 | Yoshida |
| 5,720,006 | A  |    | 2/1998  | Ballard |
| 5,734,575 | A  |    | 3/1998  | Snow et al. |
| 6,363,384 | B1 |    | 3/2002  | Cookmeyer, II et al. |
| 7,355,412 | B1 | *  | 4/2008  | Cannon ................ G01R 31/088 324/512 |
| 7,609,158 | B2 | *  | 10/2009 | Banting .............. H02J 13/0075 340/539.22 |
| 8,554,596 | B2 | *  | 10/2013 | Bailey .................... G06Q 10/06 705/7.12 |
| 2003/0028353 | A1 |  | 2/2003  | Gventer |
| 2007/0282659 | A1 | * | 12/2007 | Bailey .................... G06Q 10/06 705/7.21 |
| 2008/0100436 | A1 | * | 5/2008  | Banting .............. H02J 13/0075 340/539.22 |
| 2009/0327201 | A1 |  | 12/2009 | Muthu-Manivannan et al. |
| 2010/0085669 | A1 |  | 4/2010  | Rivers, Jr. |

OTHER PUBLICATIONS

International Search Report in corresponding International Application No. PCT/US16/00102, dated Feb. 16, 2017.

* cited by examiner

*Primary Examiner* — Mabdelmonie Elamin
(74) *Attorney, Agent, or Firm* — Edell, Shapiro & Finnan, LLC

(57) ABSTRACT

A knowledge base contains logical rules on electric power data and associated information. At least one determinant is constructed, without activity by a human user, from data that is descriptive of electricity conveyed through at least one power monitor. A determination is made as to whether any of the logical rules correspond with the determinant. Information associated with the logical rules that correspond with the determinant is provided.

20 Claims, 11 Drawing Sheets

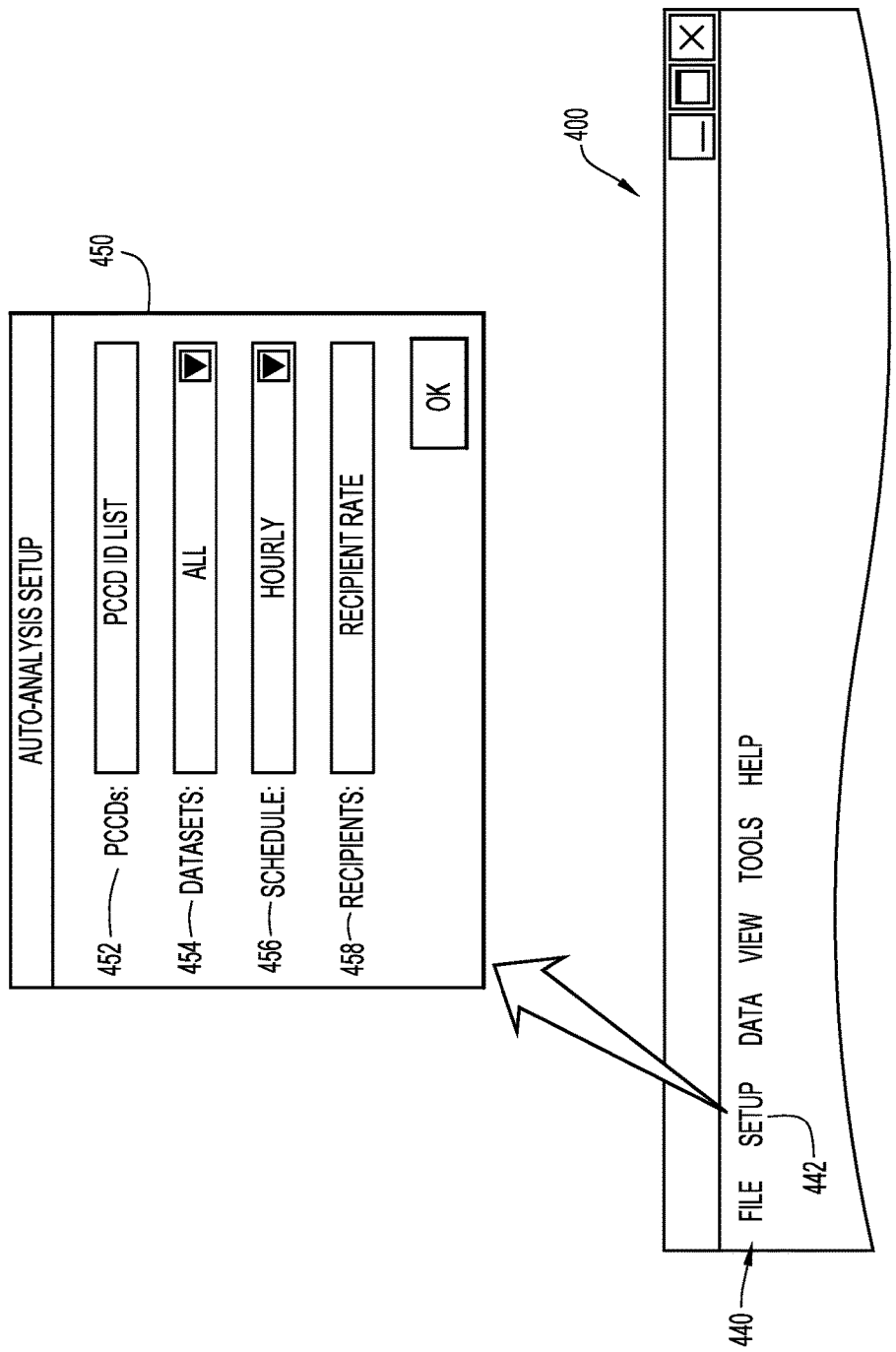

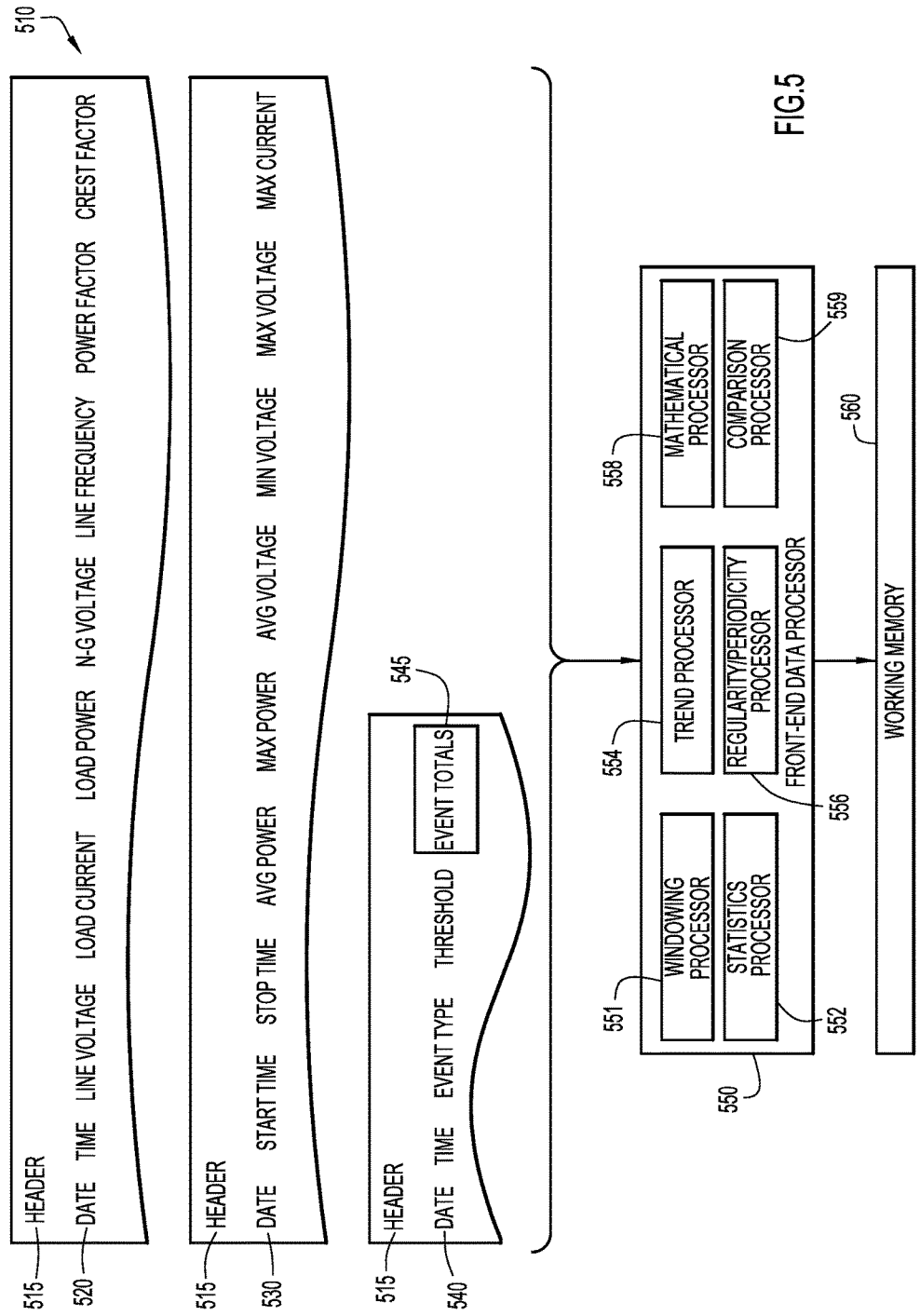

EXPERT ANALYSIS

- REPORT GENERATED ON: 2/9/2015 12:29:18 PM
- ID: Envision
- FIRMWARE VERSION: 1.GD1, 120V PRODUCT
- CHIP ID: 41.42.43
- DATA ACQUISITION PERIOD: 01/14/2015 TO 02/06/2015

BEFORE TAKING ANY OF THE RECOMMENDED ACTIONS, VERIFY THAT LOGGED EVENTS ARE ASSOCIATED WITH CONNECTED EQUIPMENT PROBLEMS/MALFUNCTIONS.
IN SOME CASES, IT MAY BE NECESSARY TO TAKE THE RECOMMENDED COURSE OF ACTION TO PREVENT FUTURE EQUIPMENT MALFUNCTION OR DAMAGE.

01. POSSIBLE IMMINENT LOAD EQUIPMENT FAILURE
02. POSSIBLE THAT NEW EQUIPMENT LOADS HAVE BEEN ADDED TO Envision SINCE DATA ACQUISITION BEGAN.
03. LOAD EQUIPMENT MAY REQUIRE SERVICE OR REPAIR.
04. REGULARLY OCCURRING LOW LINE VOLTAGES PROBABLY RESULT FROM THE OPERATION OF EQUIPMENT ON SITE SUCH AS HVAC SYSTEMS, OR POSSIBLY THAT OF CONNECTED LOAD EQUIPMENT. EVALUATE LOADS ON THE BRANCH CIRCUIT FOR PROPER OPERATION IF CONNECTED EQUIPMENT PROBLEMS ARE OCCURRING, OR MOVE CONNECTED EQUIPMENT TO A DEDICATED BRANCH CIRCUIT.
05. CONNECTED EQUIPMENT MAY BE IN OPERATION MORE FREQUENTLY SINCE DATA ACQUISITION BEGAN.
06. VOLTAGE MONIMUMS OCCUR REGULARLY ON MOST DAYS AROUND 15:36

FIG.8

EXPERT SYSTEM ANALYSIS FOR POWER MONITORING DEVICES

TECHNICAL FIELD

The present disclosure relates to expert systems and more particularly to expert systems that diagnose power-related issues from data provided by electrical power conditioning, monitoring and/or control equipment.

BACKGROUND

Modern power conditioning and control devices implement power monitoring functionality by which the electrical characteristics of an electrical supply and connected equipment are monitored, various measurements taken, and various data recorded. While the recorded data are useful in troubleshooting power related issues, manual interpretation of these data is time consuming, prone to human error, and may require expertise in the power conditioning and control equipment, in the load equipment and in general power engineering. When a user does not have such expertise, conventional techniques require a help line call or other troubleshooting assistance, which can be a considerable inconvenience for the user. Thus, it would be of considerable benefit if non-expert users of such power monitoring equipment could avail themselves of expert knowledge by automatic and/or semiautomatic mechanisms.

SUMMARY

A knowledge base contains logical rules on electric power data and associated information. At least one determinant is constructed, without activity from a human user, from data that is descriptive of electricity conveyed through at least one power monitor. A determination is made as to whether any of the logical rules correspond with the determinant. Information associated with the logical rules that correspond with the determinant is provided.

BRIEF DESCRIPTION OF THE DRAWINGS

FIG. 2, comprising

FIGS. 4A-4B are illustrations of an exemplary user interface component that can be used in conjunction with embodiments of the present general inventive concept.

FIG. 5 is a diagrammatical representation of exemplary front-end processing that can be used in conjunction with embodiments of the present general inventive concept.

FIG. 8 is a depiction of an exemplary expert analysis report 700 that may be generated by an embodiment of the present general inventive concept.

DESCRIPTION OF EXAMPLE EMBODIMENTS

Figure 1:
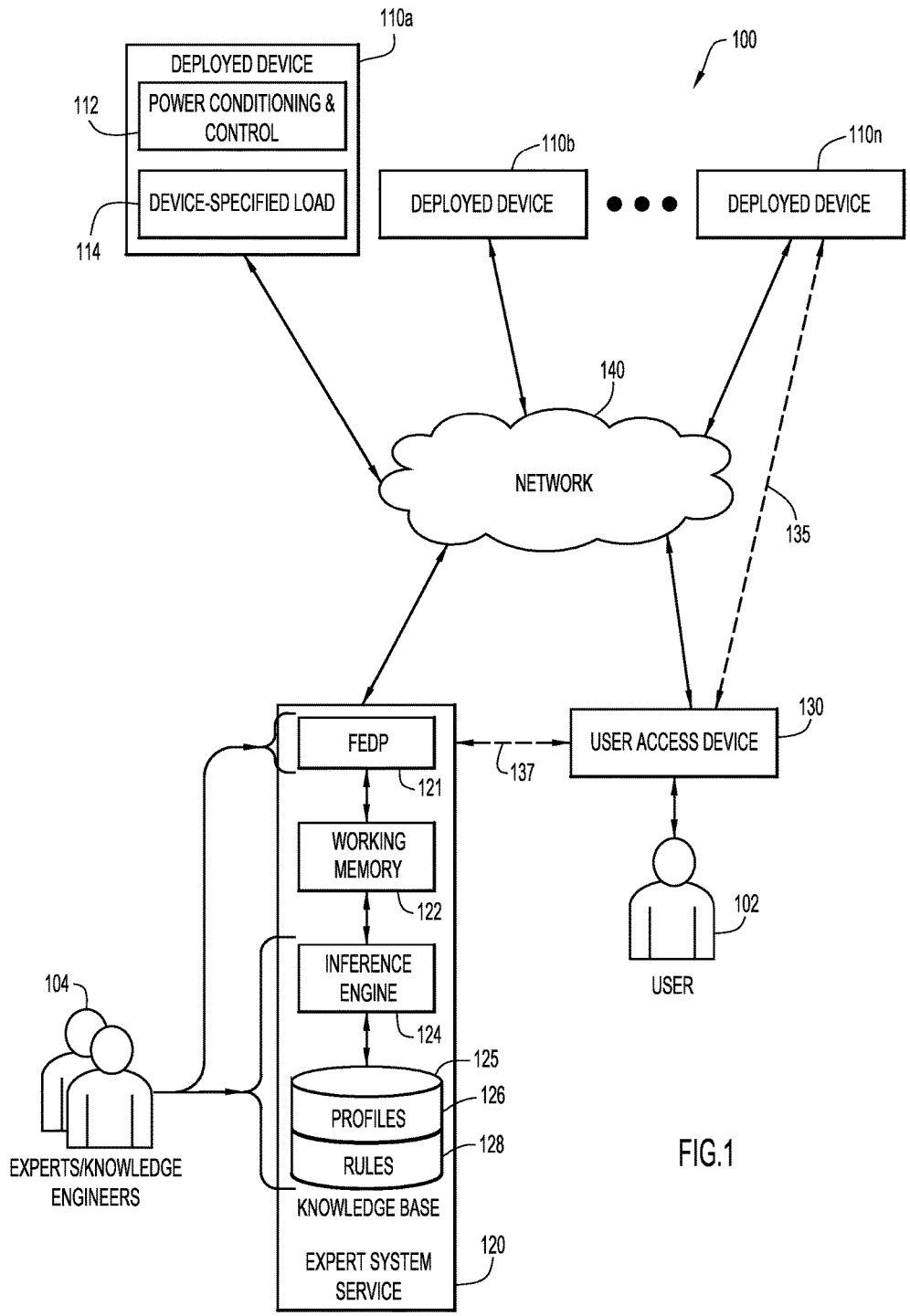
FIG. 1 is an illustration of an exemplary system embodiment of the present general inventive concept.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments.

The figures described herein include schematic block diagrams illustrating various interoperating functional modules. Such diagrams are not intended to serve as electrical schematics and interconnections illustrated are intended to depict signal flow, various interoperations between functional components and/or processes and are not necessarily direct electrical connections between such components. Moreover, the functionality illustrated and described via separate components need not be distributed as shown, and the discrete blocks in the diagrams are not necessarily intended to depict discrete electrical components.

FIG. 1 illustrates an exemplary system 100 embodiment of the present invention. System 100 includes one or more deployed devices 110a-110n, representatively referred to herein as deployed device(s) 110, each comprising a power conditioning and control component 112 that conditions, monitors and controls electrical power provided to a device-specific load component 114. It is to be understood that each deployed device 110 may have a device-specific load component 114 that is distinct from the others or may have a device-specific load component 114 that is the same as in at least one other deployed device 110. Power conditioning and control component 112 in each deployed device 110 may have different operating characteristics, e.g., rated voltage and/or current, but may have similar or identical data collection, analysis and reporting functions, such as those described below. Additionally, it is to be understood that while load component 114 and power control and conditioning component 112 are shown in a unitary device configuration, the present invention is not so limited. Indeed, power control and conditioning component 112 may be housed separately from load component 114 and may provide electrical power to load component 114 via suitable mechanisms including, but not limited to, electrical cabling and inductive powering interfaces. Moreover, it is to be understood that while load component 114 is illustrated as a single unit, load component 114 may comprise multiple load devices being provided electricity from a single power conditioning and control component 112. Additionally, certain embodiments of the present invention require little, if any, information from the load device itself; one load component 114 can be physically replaced by another load component 114, i.e., one having a different function and operational characteristics, and the analyses discussed herein will remain valid for the new load component 114.

Deployed devices 110 may be configured and operated by a user 102 at user access device 130. User access device 130 may have processing resources available by which power conditioning and control component 112 on deployed devices 110 can be operated and controlled and/or by which data collected by power conditioning and control component 112 can be viewed and/or analyzed. Data such as power quality event logs and characteristic measurements, e.g., voltage, current, temperature, etc., may be conveyed from each deployed device 110 to user access device 130 over a suitable communication channel, which may be formed through a communication network 140. Additionally or alternatively, a communication channel may be formed through a direct connection 135, e.g., a serial communication connection, between user access device 130 and a specific deployed device 110. The present invention is not limited to particular communication interfaces and protocols; those having skill in the communication arts will recognize numerous communication techniques that can be used in conjunction with the present invention without departing from the spirit and intended scope thereof.

User access device 130 may cooperate with an expert system service component 120, by which data collected from deployed devices 110 are interpreted, processed and analyzed, and from such, among other things, information can be provided to user 102 regarding probable past issues, current issues and potential future issues, as well as recommendations for mitigation of detected problems. In certain embodiments, expert system service component 120 is implemented on a server computer connected to network 140, including cloud-based server equipment, as described in more detail below. In other embodiments, expert system service component 120 is implemented, at least partially, using processing and data storage resources of user access device 130, as representatively illustrated by dashed link 137. Indeed, it is to be understood that while expert system service component 120 and user access device 130 are illustrated as separate, unitary elements, the present invention is not so limited. Upon review of this disclosure, those having skill in the pertinent arts will recognize numerous configurations, both singular and distributed, by which expert system service component 120 and user access device 130 can be implemented without departing from the spirit and intended scope of the present invention.

Additionally, it is to be understood that multiple user access devices 130 may be used to access individual deployed devices 110. One user access device 130 may be used to configure power conditioning and control component 112 and another user access device 130 (or the same user access device 130 in a separate session) may be used to analyze data collected from a connected power conditioning and control component 112.

As illustrated in FIG. 1, exemplary expert system service component 120 includes a front-end data processor (FEDP) component 121, a working memory component 122, an inference engine component 124 and a knowledge base component 125, although other functional components may be incorporated as well. The foregoing components represent a division of functionality that lends itself to efficient explanation of features of the invention, but such division is not essential to the practice of the invention. Those having skill in expert systems will recognize functional divisions other than that illustrated in FIG. 1 that may be implemented in conjunction with the present invention without departing from the spirit and intended scope thereof.

Knowledge base component 125 may be implemented in one or more suitable data storage devices and may include a profile storage component 126, in which various known component characteristics are stored, and a rule base component 128, in which a collection of machine-applicable rules is stored. In certain embodiments, the rules of rule base component 128 take the form of IF-THEN pairs or condition-action pairs, although the present invention is not so limited.

Working memory component 122 may be implemented in one or more suitable data storage devices to store one or more determinants against which rules are tested or otherwise applied. As used herein, a "determinant" is a data structure that indicates a past or present condition at the power conditioning and control component 112 from which data for analysis were obtained. A condition may be one identified in the electricity traversing the power conditioning and control component 112 or one identified via sensors distributed throughout deployed devices 110. Determinants serve as bases for knowledge base queries and are stored in working memory component 122 where they can be accessed by inference engine 124. If it is determined that a rule applies to a particular determinant, e.g., the conditional part of the rule is met by the determinant, the consequent portion of the rule may be stored in working memory component 122 and/or presented to user 102. In certain embodiments, an expert system analysis report is generated containing possible explanations for the cause of the condition corresponding to the determinant, additional troubleshooting activities and/or recommendations for mitigating the condition. In certain cases, the expert system analysis report may indicate an imminent equipment failure or changes in equipment configuration.

Inference engine component 124 may be implemented in one or more data processors and, as the name implies, is constructed or otherwise configured to make inferences based on information stored in knowledge base component 125. Inference engine component 124 may, for example, determine which rules in rule base component 128 are satisfied by the determinants in working memory 122 and may retrieve the information associated with the satisfied determination from rule base component 128. Inference engine component 124 may generate new determinants from those stored in working memory component 122 and then perform additional knowledge base queries therefrom. Inference engine component 124 may also prioritize the applicable rules and apply one or more rules having the highest priority. Other conventional inference engine functionality may be realized in embodiments of the present invention, as those having skill in the relevant arts will recognize and appreciate.

FEDP component 121 may be constructed or otherwise configured as both a data ingest mechanism and as an initial data processor for expert system component 120. As explained in more detail below with reference to FIG. 5, FEDP component 121 may obtain data from one or more power conditioning and control components 112 and produce therefrom one or more determinants. FEDP component 121 may store the determinants in working memory component 122 as bases for knowledge base queries.

Expert system service component 120 may include an interface (not explicitly illustrated) by which subject matter experts and knowledge engineers 104, referred to hereinafter as simply engineers 104, can configure services of expert system service component 120 and by which engineers 104 can populate knowledge base 125 with information. Those having skill in expert systems will recognize and appreciate how such service configuration and information population can be achieved without explicit implementation details being set forth herein. As such, only those aspects thereof that are relevant to an understanding of the present invention will be described herein.

Engineers 104 may include subject matter experts specializing in power conditioning and control components 112, in device-specific load components 114, in general power distribution and control, and in environmental measurement and control. Subject matter experts may identify causes from various symptoms that are conveyed in data from one or more power conditioning and control components 112 under varying load conditions and/or input power conditions and/or environmental conditions. Engineers 104 may generate a set of rules, e.g., IF-THEN pairs, symptom-cause pairs, condition-action pairs, etc., which may be provided to knowledge engineers for implementing in expert system service component 120.

Knowledge engineers may specialize in constructing knowledge base component 125, e.g., forming searchable rule and profile constructs from information provided by the subject matter experts. Knowledge engineers may also configure inference engine component 124 and FEDP component 121 so that, among other things, consistent analysis and search parameters are used throughout expert system service component 120. The present invention is not limited to a particular expert system implementation; knowledge engineers are free to select the paradigm that best fits the application for which the present invention is embodied.

Figure 2A:
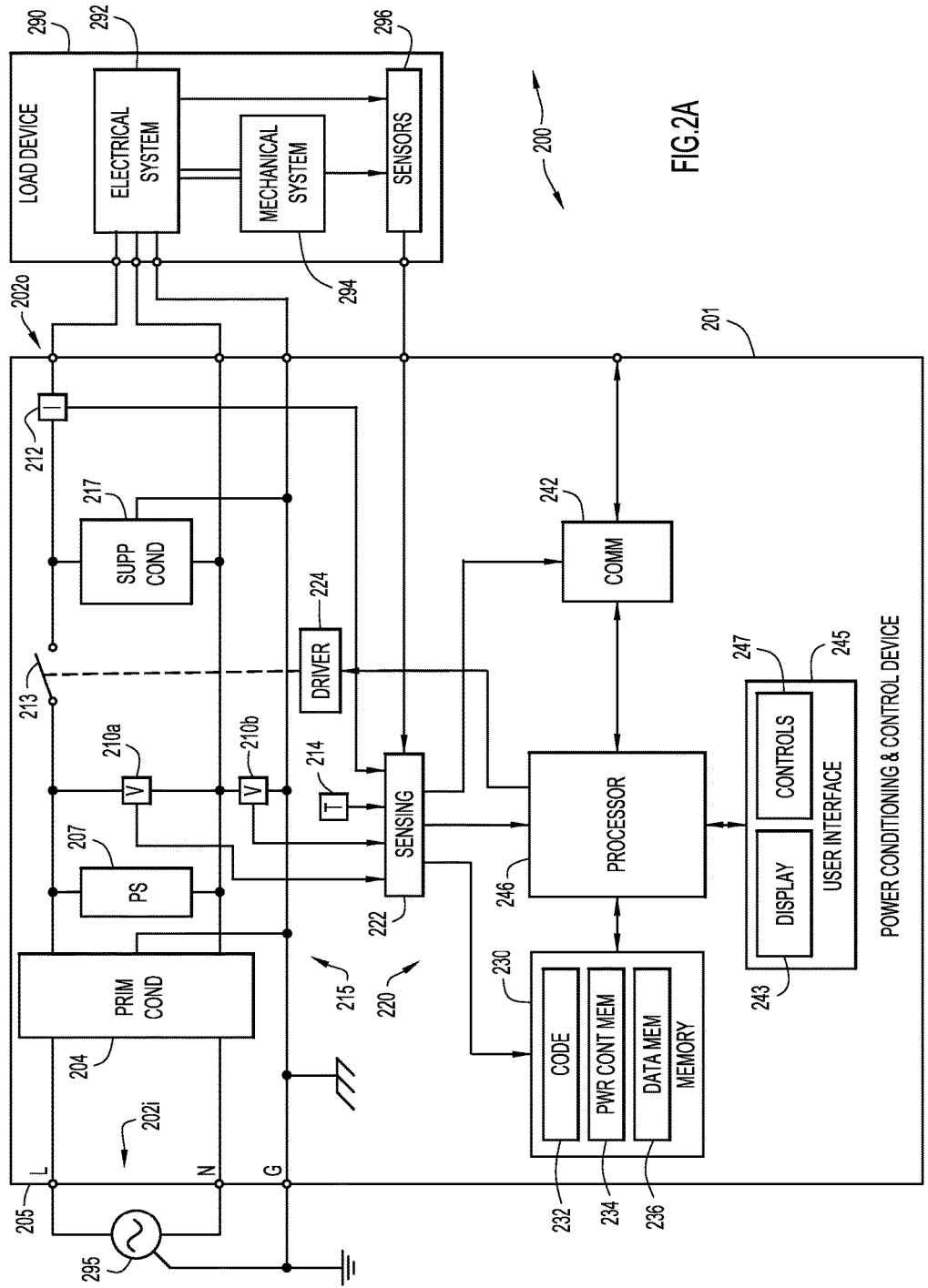
FIGS. 2A and 2B, is a schematic block diagram of an exemplary embodiment of the present general inventive concept.
Figure 2B:
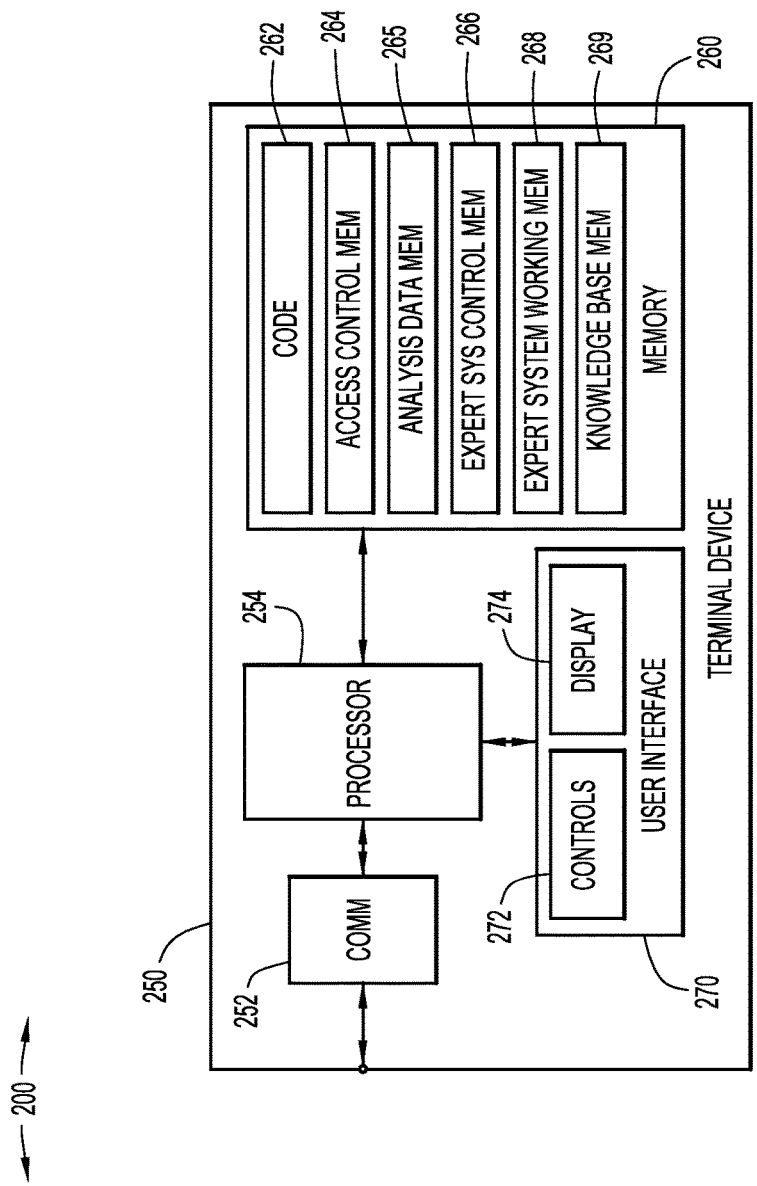

FIG. 2, which comprises FIGS. 2A and 2B, is a schematic block diagram of an exemplary embodiment of the present invention. System 200 in FIG. 2 is functionally similar to system 100 illustrated in and described with reference to FIG. 1, but is explained in more detail for purposes of facilitating a thorough understanding of the present invention.

FIG. 2A is a schematic block diagram of a power conditioning and control device (PCCD) 205 by which alternating current (AC) power provided by a power source 295 is conditioned and selectively provided to load equipment 290. It is to be understood that the present invention is not limited to operation with AC electrical power, and may also be configured for use with direct current (DC) electrical power. Additionally, although a 120V, 30 A single phase electrical service is used herein for the purpose of illustrating the concepts and embodiments of the present invention; it is to be understood that the present invention may be configured for use with various other electrical services, such as 3 phase, 230V single phase, etc. Exemplary PCCD 205 comprises an input port 202$i$ through which AC power is received from a power source, such as from a power grid, and an output port 202$o$ through which conditioned AC power is selectively provided to load equipment 290 connected thereto. In certain embodiments of the present invention, the provision of AC power to output port 202$o$ is dependent upon the conductive state of switch 213, as will be discussed below. It is to be understood that while PCCD 205 is illustrated as having a single output port 202$o$, embodiments of the present invention may be implemented with multiple output ports 202.

AC power from the AC power source 295 may be conditioned by a primary conditioning circuit 204 and a supplementary conditioning circuit 217. Primary conditioning circuit 204 may include suppression and/or series limiting circuits by which voltage transients are reduced or prevented from proceeding through the remaining circuitry of power conditioning circuit 215. Primary conditioning circuit 204 may also include filter circuits by which electromagnetic interference (EMI) and/or radio-frequency interference (RFI) are removed from the supply power. Supplementary conditioning circuit 217 may include circuits that supplement the RFI/EMI filtering and suppression of primary conditioning circuit 204. For example, secondary conditioning circuit 217 may include filter circuits to additionally remove EMI/RFI noise and may include suppression circuits to limit voltages of voltage surges to a maximum value.

PCCD 205 may include a power supply 207 to convert some of the conditioned AC power into a direct current (DC) voltage as operating power for DC circuits 220 (connections not illustrated to promote clarity in the figure). DC circuits 220 include subsystems of PCCD 205 that monitor the AC power for certain anomalies and, when such anomalies meet corresponding criteria, operate switch 213 into one of conducting and non-conducting states. Additionally, DC circuits 220 may include circuits by which data for diagnostics may be obtained.

Power conditioning circuit 215 may include several sensors by which operation of PCCD 205 is monitored. For example, PCCD 205 may include a voltage sensor 210$a$ to measure the voltage between line (L) and neutral (N) conductors on the supply side of switch 213. An additional voltage sensor 210$b$ may be incorporated to measure the voltage between the N conductor and a ground (G) conductor. PCCD 205 may also include a current sensor 212 to measure the load current through the L conductor. In certain embodiments, current sensor 212 may measure the load current through the N conductor. Current sensor 212 may be installed at different electrical locations within power conditioning circuit 215, as suits the needs of a specific incarnation of PCCD 205; on the supply side of switch 213 or on the supply side of primary conditioning circuit 204 as examples. In certain embodiments, current sensor 212 may be comprised of a plurality of current sensors 212. PCCD 205 may include additional sensors to monitor other system characteristics, such as temperature by temperature sensor 214. Each sensor generates an electrical signal that indicates the state of the system characteristic for which it is configured. The present invention is not limited to a particular set of sensors or to the construction of such sensors; the skilled artisan will recognize numerous sensor types that can be used in conjunction with the present invention without departing from the spirit and intended scope thereof.

Voltage sensors 210$a$-210$b$, representatively referred to herein as voltage sensor(s) 210, current sensor 212, temperature sensor 214, and other sensors may be coupled to sensing processor 222, which conditions the sensor signals for subsequent processing. In certain embodiments, sensing processor 222 includes analog-to-digital converters having bandwidth sufficient to sample voltage and current waveforms at standard AC line frequencies. Such bandwidth may also span frequencies associated with common power anomalies that cause power-related problems in not only attached load equipment, but also in circuitry within PCCD 205. The digital data generated by sensing processor 222 may be stored in data memory component 236 from which it may be obtained by terminal device 250 illustrated in FIG. 2B through a suitable communication link between communication interfaces 242 and 252.

Processor 246 may analyze the sensor data produced by sensing processor 222 to assess, among other things, power quality with respect to power quality criteria. When the power quality does not meet acceptability criteria, processor 246 may provide a power control signal to switch driver 224, which, in turn, compels switch 213 into a conductive or non-conductive state. For example, in response to overvoltage or undervoltage conditions, referred to herein as overvoltage or undervoltage power quality events, switch 213 may be compelled into a non-conductive state and, when such overvoltage and undervoltage conditions have been corrected, processor 246 may generate a power control signal to compel switch 213 into a conductive state. Other criteria may be associated with other actions. For example, certain voltage or current levels may invoke a data recording operation without a change of state in switch 213.

Processor 246 may be communicatively coupled to a memory 230 in which may be stored processor instructions in code segment 232, power control parameters in power control memory segment 234 and measurement samples from sensing processor 222 and/or power quality event logs in data memory segment 236. Power control parameters may include power event criteria according to which actions, e.g., switch operation, data logging, etc., are taken. Power quality event logs may contain time-stamped power quality event information. Power quality events include, but are not limited to, overvoltage, undervoltage, overcurrent, undercurrent, over-temperature events, each of which may be defined by establishing a voltage, current or temperature level at which the event is said to occur. The levels may be set by a user through configuration controls. PCCD 205 may be configured and may operate in a manner described in U.S. Pat. No. 8,520,349, issued on Aug. 27, 2013 and entitled, "Supply Voltage Monitor," the disclosure of which is incorporated herein by reference in its entirety. However, it is to be understood that the present invention is limited neither to particular circuitry that provides power from a power source to a load nor that by which power monitoring functionality is implemented.

Processor 246 may also be communicatively coupled to a user interface 245, which may be implemented on a panel disposed on an exterior surface of a housing, representatively illustrated by boundary 201. User interface 245 may include a display 243 on which to display system status, for example, and user controls 247 by which a user can perform certain power monitor and control operations. The present invention is not limited to a particular user interface configuration and may be embodied without such a user interface 245 in PCCD 205.

Processor 246 may be communicatively coupled to a communication interface 242 through which PCCD 205 communicates with external equipment, such as terminal device 250 illustrated in FIG. 2B. The present invention is not limited to a particular communication interface, which may be implemented in accordance with a serial communication protocol, such as RS-232 or Universal Serial Bus (USB), a parallel communication protocol, such as peripheral component interconnect (PCI) or a telecommunication network protocol, such as Ethernet.

As illustrated in FIG. 2A, PCCD 205 may be electrically and, in certain configurations, mechanically coupled to one or more load devices 290 through output port 202o. The present invention is not limited to the type, construction and/or function of load equipment attached to PCCD 205; typical load devices may include an electrical system 292 that derives electrical power from PCCD 205 for purposes of driving a mechanical system 294. Other load devices may be entirely electrical and still others may have minor mechanical components, such as cooling fans. In certain embodiments, load device 290 may include one or more sensors 296 that provide operational state information of the device itself or of components therein. It is to be understood that while such sensors may enhance the analyses described herein, sensors internal to load device 290 are not required to practice the present invention. Moreover, it is to be understood that expert systems embodying the present invention can be realized that have no knowledge of the load device 290 to which PCCD 205 is attached. When so embodied, profile component 126 of knowledge base component 125 may be omitted.

FIG. 2B illustrates a terminal device 250, which can be constructed or otherwise configured as a user access device 130 and/or an expert system service component 120. In the illustrated embodiment, exemplary terminal device 250 is constructed or otherwise configured as a combined user access device/expert system component.

Exemplary terminal device 250 includes a processor 254 constructed or otherwise configured to implement, among other things, diagnostic functionality for assessing power problems in PCCD 205 and load equipment 290 coupled thereto. In one embodiment, processor 254 executes processor instructions stored in code segment 262 of memory component 260 to implement user access device and expert system service functionality. Access control parameters in access control memory segment 264 may be used to implement controls by which user access device functionality is controlled and/or configured, and analysis data memory segment 265 may implement data storage for collected measurement, historical and event data, which are described in more detail below. Expert system control parameters in expert system control memory segment 266 may be used to implement controls by which expert system service functionality is controlled and/or configured. Memory component 260 may also include an expert system working memory segment 268 and a knowledge base memory segment 269 that implement data working memory and knowledge base storage, respectively.

Terminal device 250 may include a user interface component 270 communicatively coupled to processor 254. User interface component 270 may include a display 274, which may be a computer display, and user controls 272, which may be one or more human interface devices, e.g., a keyboard, a mouse, etc. Processor 254 may execute processor instructions stored in code segment 262 that form a graphical user interface (GUI) on user interface 270. However, it is to be understood that the present invention is not limited to a particular user interface on terminal device 250.

Terminal device 250 may include a communication interface 252 that is complementary to communication interface 242 in PCCD 205. As indicated above, communication interfaces 242 and 252 may interoperate in conventional ways to form a communication link between terminal device 250 and selected PCCD(s) 205.

Figure 3:
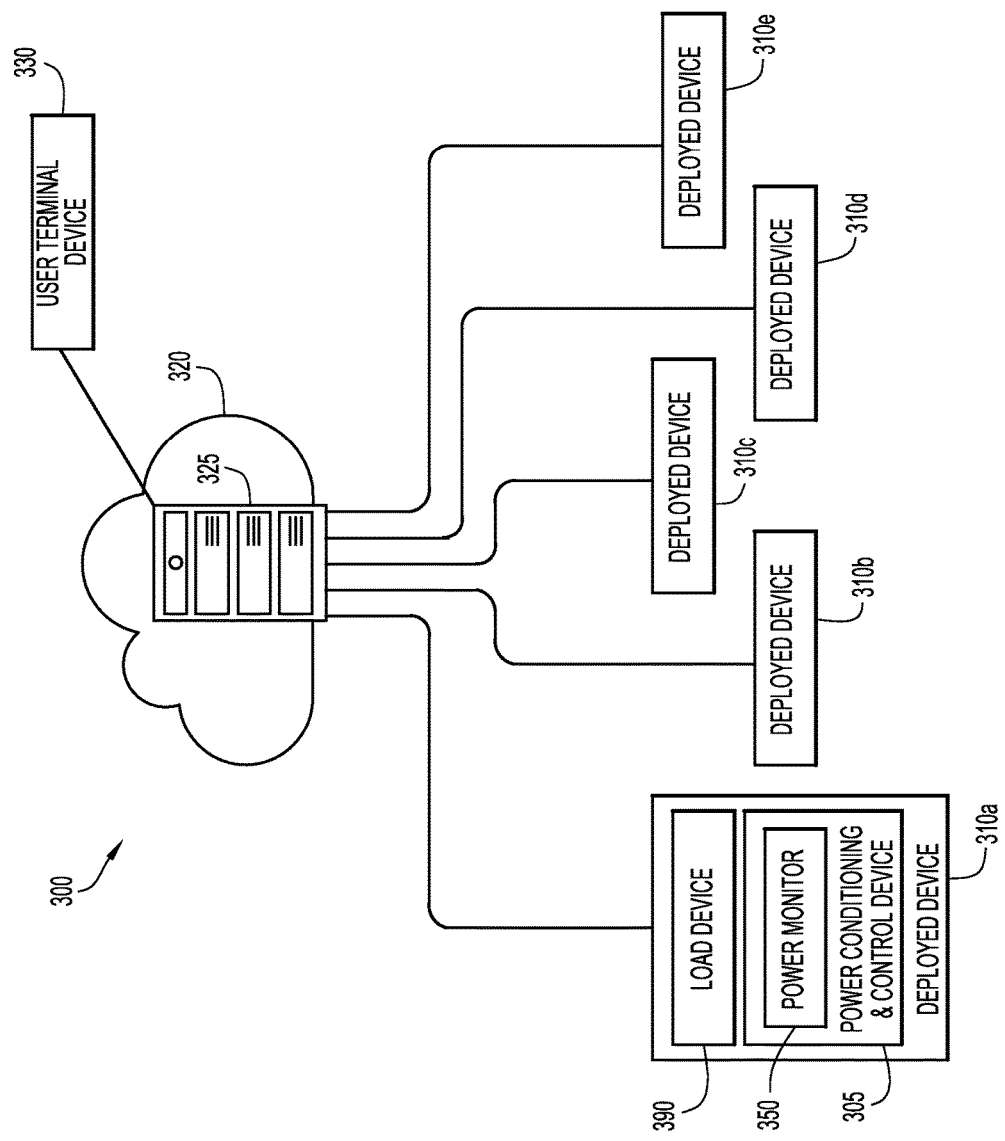
FIG. 3 is an illustration of another exemplary system embodiment of the present general inventive concept.

FIG. 3 is a schematic block diagram of a system 300, which may comprise various components illustrated in and described with reference to FIG. 2. System 300 may include one or more (typically many) deployed devices 310a-310e, representatively referred to herein as deployed device(s) 310. Deployed devices 310 may be communicatively coupled to an enterprise cloud 320 comprising one or more servers 325 on which an expert system service, such as expert system service 120 described with reference to FIG. 1, may be implemented. A user at a user terminal device 330 may also have access to enterprise cloud platform 320, such as to configure the expert system service and/or receive analysis reports. As such, user terminal device 330 may be constructed or otherwise configured similarly to terminal device 250 illustrated in FIG. 2, with the exception of the expert system functionality, e.g., that realized by expert system controls in memory location 266, expert system working memory 268 and knowledge base memory 269. In the exemplary embodiment of FIG. 3, such expert system functionality is implemented by server 325, which may be constructed or otherwise configured similarly to terminal device 250, with the exception of the access device functionality realized by access control in memory location 264. That is, as mentioned above, the functionality realized by terminal device 250 in FIG. 2 is divided between user terminal device 330 and server 325 in the embodiment of FIG. 3.

Deployed devices 310 may be constructed or otherwise configured similarly to the combination of PCCD 205 and load device 290 illustrated in FIG. 2. However, for purposes of description and not limitation, certain circuitry of PCCD 205 is abstracted in FIG. 3 as power monitor 350 in PCCD 305. A "power monitor," as used herein, is a component that probes electricity traversing that component, assesses the electricity against various criteria and compels some action, if appropriate, based on such assessment. It is to be understood that, despite its name used herein, power monitor 350 may assess other characteristics of a deployed device 310, e.g., temperature, humidity, etc. In one embodiment, power monitor 350 comprises, with reference to FIG. 2A, voltage sensors 210, current sensor 212, temperature sensor 214, sensing processor 222 and portions of code 232 executing on processor 246. Those having skill in the control arts will recognize other circuit configurations that realize a power monitor so as to be used in conjunction with the present invention without departing from the spirit and intended scope thereof.

In certain embodiments of the present invention, power monitor 350 in each deployed device 310 automatically, e.g., according to some schedule, established rules, etc., uploads its collected data to server 325 of enterprise cloud platform 320. Such data may be ingested, processed and analyzed by an expert system service component implemented on enterprise cloud platform 320, such as by techniques described below, and suitable analysis reports may be issued to user terminal device 330.

Deployed devices 310 may be geographically distributed and need not have the same load device(s) 290 coupled thereto. Accordingly, expert systems constructed or otherwise configured to practice the present invention can diagnose electrical/environmental issues over arbitrarily large regions of space. Embodiments of the present invention may thus provide insight as to the past/present/future conditions of not only connected load equipment 290, but also of load equipment not directly connected to PCCD 205 and of electrical generation/distribution hardware.

Figure 4A:
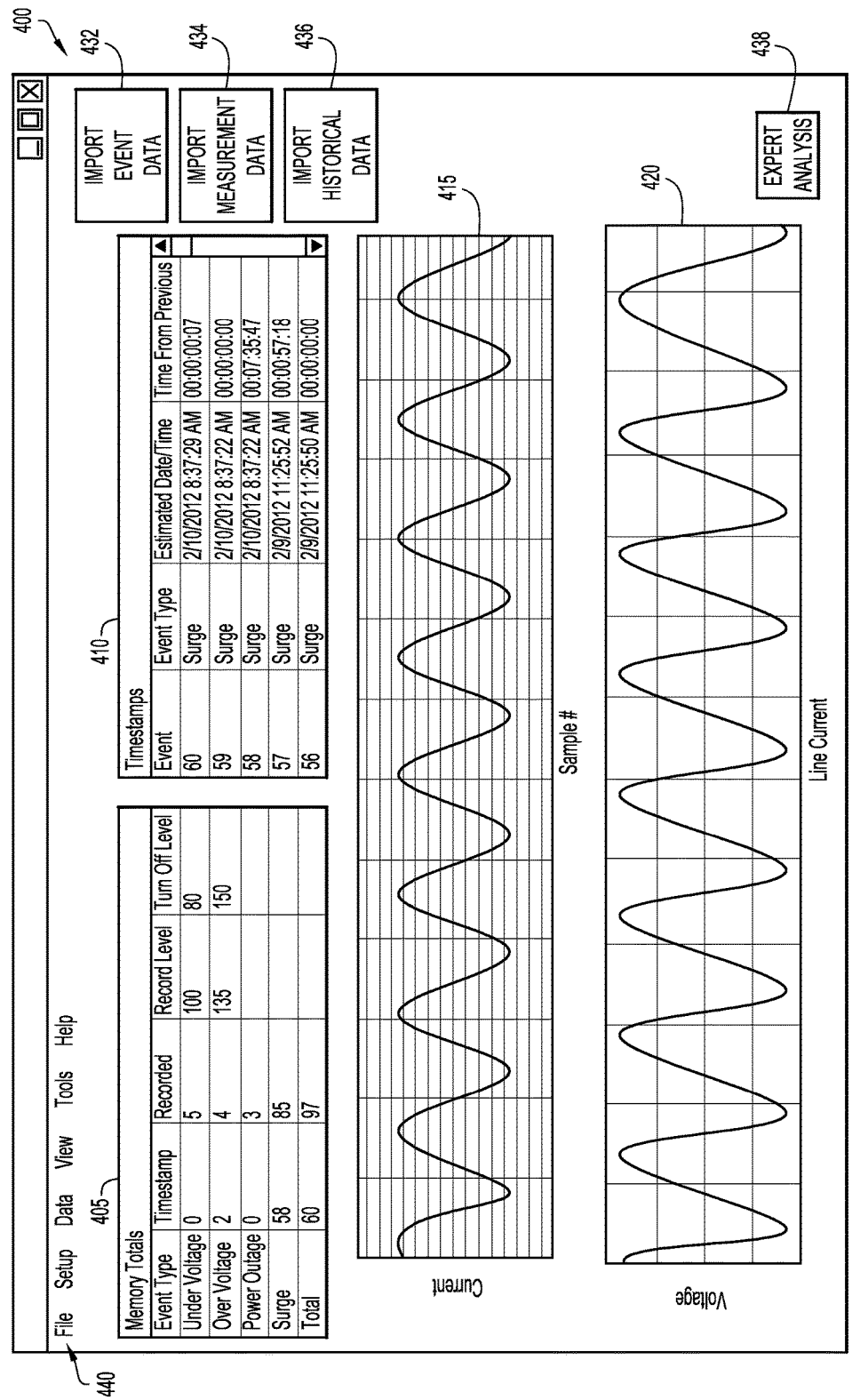

FIGS. 4A-4B, collectively referred to herein as FIG. 4 are illustrations of an exemplary user interface component 400 that can be used in conjunction with embodiments of the present invention. For example, user interface component 400 may be presented to a user on user interface 270 of terminal device 250 illustrated in FIG. 2. User interface component 400 may include several data views such as, for example, a memory totals data view 405, in which counts of power quality events by event type for a given data collection period are displayed, and a timestamped event data view 410, in which occurrences of power quality events are displayed along with the time at which the power quality events occurred. User interface component 400 may also include a voltage measurement data view 415 and a current measurement data view 420. The data displayed in each data view of user interface component 300 may be retrieved from a PCCD 205 via suitable interface controls, such as an import event data control 432, an import measurement data control 434 and an import historical data control 436. As a user reviews the retrieved data in the various data views of user interface component 400, the user may initiate an expert analysis session using the retrieved data by activating expert analysis control 438.

User interface component 400 may realize many different data collection and analysis tools without departing from the spirit and intended scope of the present invention, as those having skill in the data analysis arts will recognize and appreciate. In certain embodiments, such tools may be accessible through various interface controls, such as menus 440. For example, referring to FIG. 4B, an auto-analysis setup tool may be configured through a suitable setup dialog 450 instantiated through an item (not illustrated) located under the SETUP menu 442. The auto-analysis tool may be implemented to compel embodiments of the present invention to collect, process, analyze and report on data from one or more PCCDs 205 without user intervention (other than to establish when, e.g., by a schedule, such collecting, processing, analyzing and reporting is to be performed). To that end, auto-analysis setup dialog 450 may include a PCCD identifier control 452, a dataset control 454, a schedule control 456 and a recipient control 458. It is to be understood that mechanisms other than those illustrated in and described with reference to FIG. 4B may be implemented to schedule automatic analyses in embodiments of the present invention without departing from the spirit and intended scope thereof.

Exemplary PCCD identifier control 452 provides a mechanism by which a user can identify which PCCDs 250 are scheduled. A user may enter a list of predetermined PCCD identifiers, including ID numbers, IP addresses, etc. Exemplary dataset control 454 provides a mechanism by which the data to be analyzed are selected. Exemplary schedule control 456 provides a mechanism by which the analyses are scheduled, e.g., hourly, daily, etc. In certain embodiments, schedule control 456 may be implemented to allow date and time scheduling, as those having skill in the pertinent art will recognize and appreciate. Exemplary recipient control 458 provides a mechanism by which intended recipients of alerts, analysis reports, etc. are selected and/or identified. Recipients may be identified by suitable identifiers, such as mobile phone numbers, email address, etc.

In certain embodiments, data identified via dataset control 454 are collected from the PCCDs identified via PCCD control 452 at the scheduled time selected via schedule control 456. The collected data may be processed and analyzed according to the present invention and the results of the analysis may be distributed to the recipients identified via recipient control 458. One or more of the recipients may take appropriate action as specified in an analysis report, as described below. In certain embodiments, such action may be performed remotely, such as through a portal configured on the recipient's device at which the analysis report was sent by the expert system service component.

FIG. 5 is a diagrammatical representation of exemplary front-end processing that can be used in conjunction with embodiments of the present invention. FEDP 550 may serve as FEDP component 121 of system 100 illustrated in and described with reference to FIG. 1 and working memory 560 may serve as working memory component 122 of system 100.

Input data 510 may be accepted by FEDP 550 in one or more input data structures or files, e.g., a measurement data file 520, a historical data file 530 and a power quality event data file 540. Data files 520, 530 and 540 may include respective file headers, representatively illustrated at file header 515, containing information regarding the particular PCCD from which the data were obtained. File header 515 may include, among other possible information items, a product and/or device configuration identifier, version identifiers of PCCD firmware and software, a media access control (MAC) address and/or Internet protocol (IP) routing address, etc.

Measurement data file 520 may include an array or table of timestamped measurements of various parameters including, but not limited to, line voltage, load current, load power, neutral-to-ground (N-G) voltage, line frequency, power factor and crest factor. Historical data file 530 may include an array or table of statistical data computed over selected time periods defined by a start time and a stop time. Such statistical data may include, without being limited to, average power, maximum power, average voltage, minimum voltage, maximum voltage and maximum current. Power quality event data file 540 may include an array or table of timestamped power quality events, as indicated by an event type and the corresponding threshold by which the event is defined. Power quality event data file 540 may also include an array or table 545 of event totals indicating the number of each event type that occurred during the data collection period defined in the power quality event data file 440.

FEDP 550 may be constructed or otherwise configured to accept input data 510 and to process the data so as to form determinants upon which knowledge base queries are based. In certain embodiments, FEDP 550 performs various operations on the input data, as representatively illustrated by windowing processor component 551, statistics processor component 552, trend processor component 554, regularity/periodicity processor component 556, mathematical processor component 558 and comparison processor component 559. It is to be understood that the partitioning of FEDP 550 into separate functional components is for purposes of description and not limitation. Embodiments of the present invention may implement other functionality in FEDP 550 in addition to and/or instead of that illustrated and described herein. Indeed, upon review of this disclosure, those having skill in the pertinent technical arts will recognize numerous front-end data processing configurations that can be realized in embodiments of the present invention without departing from the spirit and intended scope thereof.

Windowing processor component 551 may be constructed or otherwise configured to establish one or more data windows across a user-selectable number of data items. The user may specify the data window size through an expression of time (hour, day, week, etc.) or through an expression of a number of rows (data items) in a data table defined in one or more data files 520, 530 and 540. In most cases, the data window is uniform, i.e., each data item in the window is weighted the same as all other data items in the window. However, it is to be understood that the present invention is not so limited; data windows having various weighting profiles may be realized in embodiments of the present invention. Additionally, the data window can be realized as a moving window and it is to be understood that the data window need not encompass a continuous span of contiguous data items. Those having skill in the data analysis arts will recognize, upon review of this disclosure, a wide variety of data windows that can be used in embodiments of the present invention.

Statistics processor component 552 may be constructed or otherwise configured to compute statistics on the data items contained in a particular data window. Such statistics may include, without being limited to, mean value, median value, standard deviation, number of data items having the same value in a particular data window, etc. Other statistics may be computed by statistics processor 552 as needed for particular analyses, as will be recognized and appreciated by those having skill in the pertinent arts.

Trend processor component 554 may be constructed or otherwise configured to determine whether a trend exists in the windowed data. For example, trend processor component 554 may implement a numerical differentiator from which positive or negative slopes in the windowed data can be identified. Other trend determining techniques may be realized as well depending on the analyses being performed.

Regularity/Periodicity (R/P) processing component 556 may be constructed or otherwise configured to determine whether values or states appear in the windowed data with some identifiable regularity or is periodic. For example, R/P processing component 556 may determine whether a power quality event occurs every day at arbitrary times (regular) or whether one or more out-of-tolerance measurements occur every hour at a particular time (periodic).

Mathematical processor component 558 may be constructed or otherwise configured to perform mathematical operations on input data 510. For example, mathematical processor component 558 may selectively add, subtract, multiply and divide data values in input data 510.

Comparison processor component 559 may be constructed or otherwise configured to compare data items including items in input data 510 and items produced by other functional components of front-end data processor 550. Comparison processor component 559 may also compare such data items to parameters established by a user or analyst. In certain embodiments, comparison processor component 559 generates an indication of logical TRUE when the comparison conditions are met and generates an indication of logical FALSE when the comparison conditions are not met.

Exemplary FEDP 550 accepts or otherwise obtains input data 510 and produces one or more determinants from those data using one or more data processing components 551-559 and through general data processing capabilities realized by FEDP 550. The determinants may be stored in working memory 560 where they can be accessed by inference engine component 124.

Figure 6:
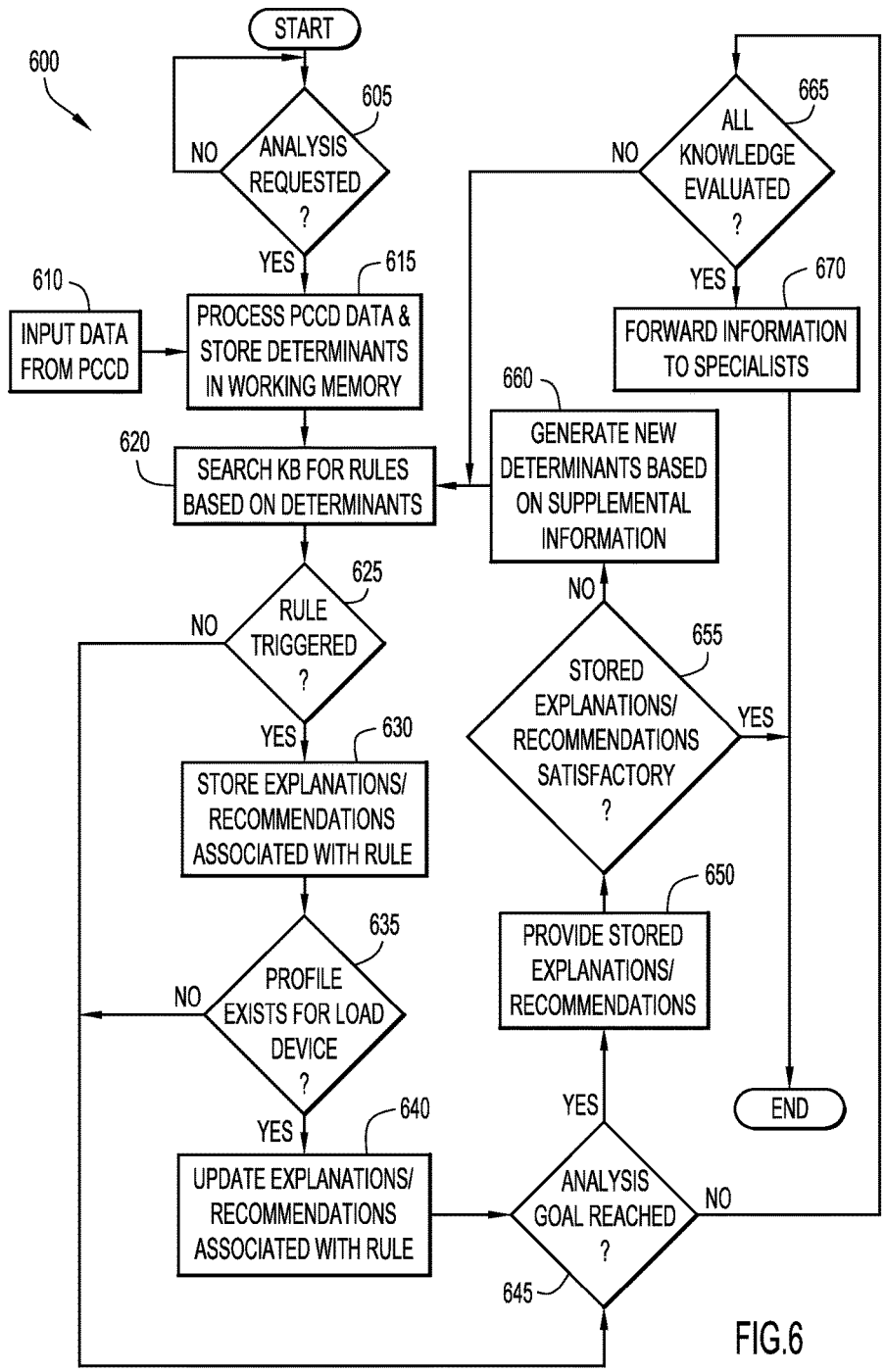
FIG. 6 is a flow diagram of an exemplary analysis process performed using an exemplary expert system embodiment of the present general inventive concept.

FIG. 6 is a schematic flow diagram of an exemplary analysis process 600 performed using an exemplary expert system embodying the present invention. It is to be understood that the operations illustrated in and described with reference to FIG. 6 have been functionally partitioned and arranged in an order that facilitates efficient explanation of an exemplary embodiment of the present invention. Upon review of this disclosure, those having skill in the pertinent arts will recognize additional and/or other operations and/or alternative orderings of operations that can be realized in embodiments of the present invention without departing from the spirit and intended scope thereof.

In operation 605, it is determined whether expert system analysis is requested, where such a request may be achieved by a scheduled automatic analysis session or by activation of a suitable user control, such as expert analysis control 438 of user interface component 400. In response to affirming that an analysis has been requested, process 600 may transition to operation 615 by which input data 610 from a PCCD are processed, such as by FEDP 550, and the generated determinants are stored in working memory, such as working memory 560. The stored determinants form a knowledge base query and, in operation 620, the knowledge base is searched for rules that correspond to the stored determinants. In operation 625, it is determined whether a rule has triggered, i.e., a rule corresponding to one or more determinants have been located in the knowledge base. If so, process 600 may transition to operation 630, by which explanations/recommendations associated with the triggered rule are stored in working memory. In operation 635, it is determined whether a profile exists for the load device coupled to the PCCD from which the input data were obtained. If so, process 600 may transition to operation 640, by which the explanations/recommendations stored in working memory are updated with load-related information.

If no load profile exists, as determined in operation 635, or subsequent to updating the stored explanations/recommendations in operation 640, process 600 may transition to operation 645, by which it is determined whether an analysis goal has been reached. Such determination may be realized by a user exiting the analysis due to sufficient explanations/recommendations being compiled. In other embodiments, the analysis goal is reached when all determinants in working memory have been analyzed to the extent possible for a given knowledge base population. If the analysis goal has been reached, process 600 may transition to operation 650, by which the stored explanations/recommendations are provided to a user. In one embodiment, a report is generated, such as report 800 illustrated in and described with reference to FIG. 8 below. In operation 655, it is determined whether the explanations/recommendations stored in working memory are satisfactory, e.g., have correctly identified a cause of a particular power related issue and/or mitigation strategies for that issue. A user may determine whether the stored explanations/recommendations are satisfactory by physical verification, onsite equipment analysis and/or by applying the mitigation strategies. If the explanations/recommendations have been found satisfactory, process 600 may exit; otherwise, process 600 may transition to operation 660, by which additional analyses can be performed such as generating new determinants from supplemental information and/or from the information stored in working memory, e.g., previous determinants, explanations/recommendations, etc. Process 600 may transition to operation 620, by which the new determinants are searched, and continue from that point.

If, in operation 645, it is determined that the analysis goal has not been reached, process 600 may transition to operation 665, by which it is determined whether all knowledge has been evaluated. Such a condition may exist if few if any rules are found in the knowledge base that relate to the stored determinants. If it is determined that all knowledge has not been evaluated, process 600 may transition to operation 620 and continue from that point. Otherwise, if all knowledge has been evaluated (and the analysis goal not reached as determined in operation 645), process 600 may transition to operation 670, by which the relevant information is forwarded to specialists, e.g., engineers 104. Process 600 may then exit.

If, in operation 625, it is determined that no rule is triggered, process 600 may transition to operation 645, by which it is determined whether the analysis goal has been reached, as described above. If not, process 600 may transition to operation 665, by which it is determined whether all knowledge, i.e., the relevant portions of the knowledge base, has been evaluated for the determinant(s) being sought. If not, process 600 may transition to operation 620, by which the knowledge base is once again searched for rules corresponding to the determinant(s). Process 600 continues from that point.

Figure 7A:
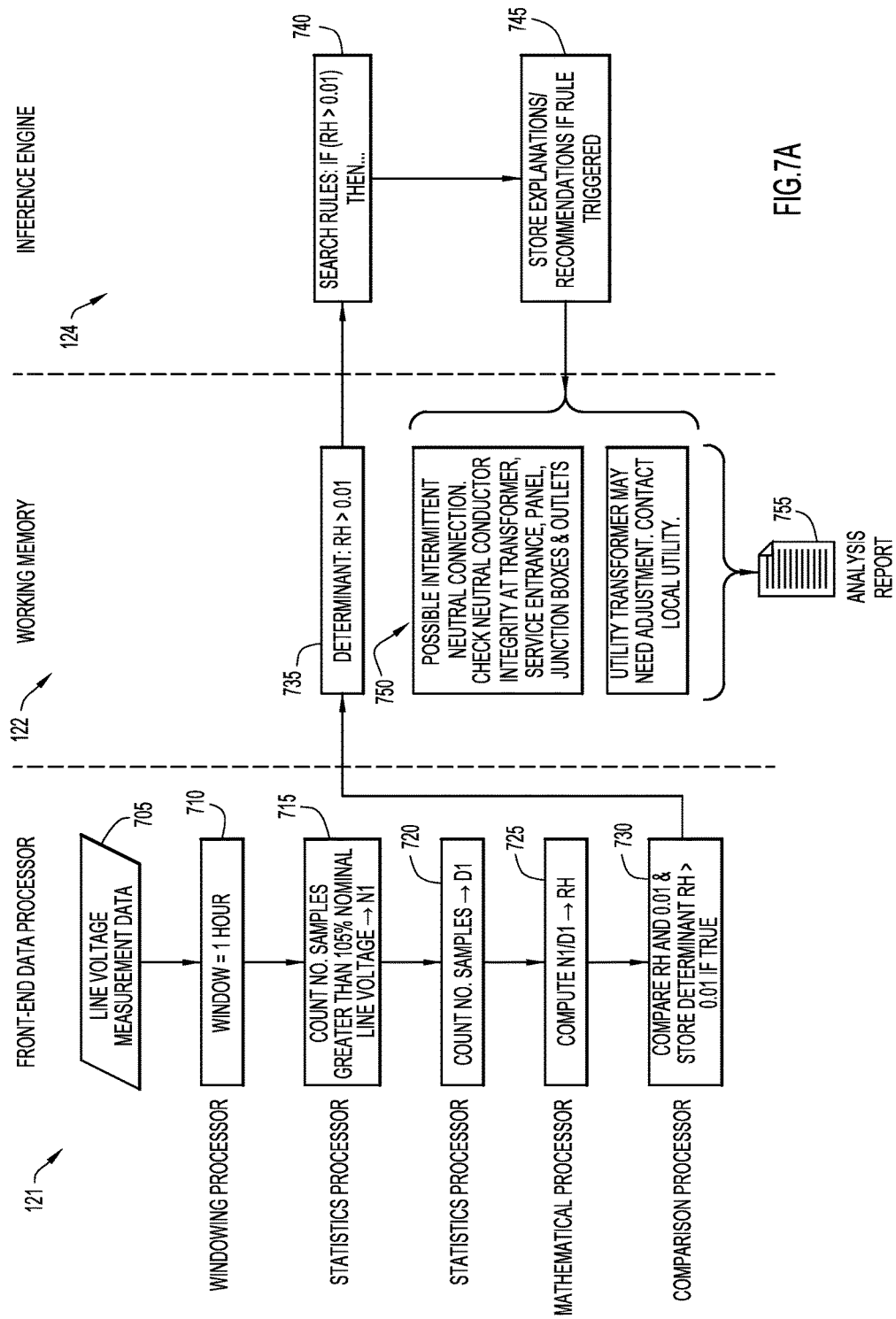
FIGS. 7A-7B are functional flow diagrams of specific examples of exemplary expert analysis sessions using an embodiment of the present general inventive concept.
Figure 7B:
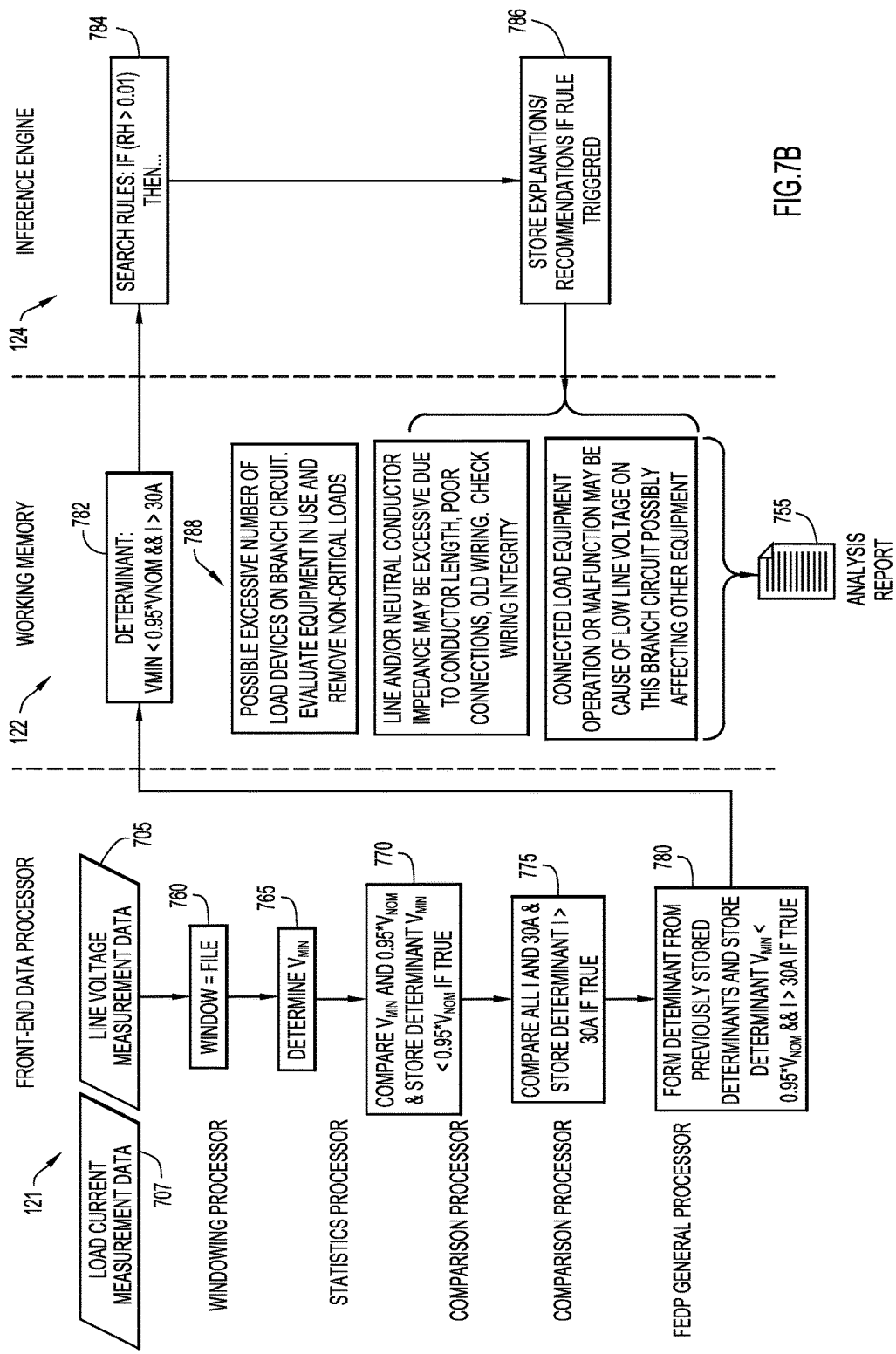

FIGS. 7A-7B, collectively referred to herein as FIG. 7, are functional flow diagrams of specific examples of exemplary expert analysis sessions. The flows depicted in FIG. 7 occur within and between FEDP component 121, working memory component 122 and inference engine component 124 of exemplary expert system service component 120 illustrated in and described with reference to FIG. 1. It is to be assumed that the specific examples depicted in FIG. 7 follow the logic of expert analysis process 600 of FIG. 6, although correlation between operations of FIG. 6 and those of FIG. 7 will not be explicitly set forth herein.

As illustrated in FIG. 7A, line voltage measurement data 705 are selected for analysis, such as through activation of a suitable data selection control of user interface component 400. By other such controls, or by pre-programmed functionality of expert system service component 120, FEDP 121, as implemented by, for example, FEDP 550 illustrated in and described with reference to FIG. 5, may perform the following operations: in operation 710, a window may be established having a one (1) hour window length; in operation 715, the number of line voltage measurement samples within the window having a line voltage measurement value greater than 105% of nominal are counted and stored in a variable N1; in operation 720, the total number of line voltage measurement samples within the window are counted and stored in a variable D1; in operation 725, the ratio of N1 to D1 is computed and stored in a variable RH; and in operation 730, the ratio RH is compared with a threshold value, e.g., 0.01, i.e., a logically-testable condition, and the determinant RH>0.01 is stored in working memory component 122 if the logically-testable condition is true. The determinant is illustrated as determinant 735 in working memory component 122.

In response to determinant 735 being stored, inference engine component 124 may conduct a knowledge base search for the rule IF (RH>0.01) THEN . . . in operation 740. If the rule is triggered, the explanations/recommendations associated with the rule, i.e., contained in the THEN clause of the rule, are stored in working memory component 122 in operation 745. The corresponding explanations/recommendations are illustrated as explanations/recommendations 750 in working memory component 122. Once the analysis has been satisfactorily completed, explanations/recommendations 750 may be formatted into an analysis report 755.

The expert system session illustrated in FIG. 7B utilizes load current measurement data 707 for analysis in addition to line voltage measurement data 705. In operation 760, a window may be established having the file length of the measurement data file from which the data are obtained. It is to be understood that such file length window may be applied to the data collected over a predetermined period and stored in PCCD memory, such as in data memory 236. In operation 765, line voltage measurement samples within the window are analyzed to determine $V_{MIN}$, i.e., the minimum recorded voltage. It is to be noted that $V_{MIN}$ may also be obtained from historical data, e.g., from historical measurement data file 530. In operation 770, it is determined whether $V_{MIN}$ is less than 95% of nominal voltage $V_{NOM}$ and, if true, the determinant $V_{MIN}<0.95*V_{MON}$ is stored in working memory component 122. In operation 775, all current measurements (I) in the window, i.e., in the measurement data file, are compared with 30 A to determine whether any I>30 A. If so, the determinant I>30 A may be stored in working memory component 122. In operation 780, it is determined whether an occurrence of $V_{MIN}<0.95*V_{MON}$ and an occurrence of I>30 A are concurrent, i.e., whether ($V_{MIN}<0.95*V_{MON}$) AND (I>30 A), a logically-testable condition, is true. If so, the determinant ($V_{MIN}<0.95*V_{MON}$) AND (I>30 A) is stored in working memory component 122. The determinant is illustrated as determinant 782 in working memory component 122.

In response to determinant 782 being stored, inference engine component 124 may conduct a knowledge base search for the rule IF{$(V_{MIN}<0.95*V_{MON})$ AND $(I>30 A)$} THEN . . . in operation 784. If the rule is triggered, the explanations/recommendations associated with the rule, i.e., contained in the THEN clause of the rule, are stored in working memory component 122 in operation 786. The corresponding explanations/recommendations are illustrated as explanations/recommendations 788 in working memory component 122. Once the analysis has been satisfactorily completed, explanations/recommendations 788 may be included in analysis report 755.

FIG. 8 is a depiction of an exemplary expert analysis report 800 that may be generated by embodiments of the present invention. It is to be understood that the present invention is not limited a particular analysis report format or to particular media by which the report contents are conveyed to a user. As illustrated in FIG. 8, expert analysis report 800 includes a header 810 and a report body 820. Header 810 may include general information, such as the date and time the report was generated, product identification data and the data acquisition period over which the data used in the analysis were collected. Report body 820 may contain explanations, recommendations, warnings, informative analysis remarks, etc., essentially without limit.

Certain embodiments of the present general inventive concept provide for the functional components to manufactured, transported, marketed and/or sold as processor instructions encoded on computer-readable media. The present general inventive concept, when so embodied, can be practiced regardless of the processing platform on which the processor instructions are executed and regardless of the manner by which the processor instructions are encoded on the computer-readable medium.

It is to be understood that the computer-readable medium described above may be any non-transitory medium on which the instructions may be encoded and then subsequently retrieved, decoded and executed by a processor, including electrical, magnetic and optical storage devices. Examples of non-transitory computer-readable recording media include, but not limited to, read-only memory (ROM), random-access memory (RAM), and other electrical storage; CD-ROM, DVD, and other optical storage; and magnetic tape, floppy disks, hard disks and other magnetic storage. The processor instructions may be derived from algorithmic constructions in various programming languages that realize the present general inventive concept as exemplified by the embodiments described above.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. An apparatus comprising:
    a communication interface to communicate with a network;
    a storage unit that stores a knowledge base containing logical rules on electric power data and explanation or recommendation information associated with the logical rules; and
    a processor, coupled to the communication interface and the storage unit, to:
    generate for display a user interface and receive via the user interface identification of input data descriptive of electricity conveyed through at least one power monitor;
    responsive to the identification, and without activity by a human user:
        obtain the input data from the power monitor over the network;
        process the input data in a data file format into a logically-testable condition for electrical power using predetermined processing operations;
        determine whether the logically-testable condition evaluates to true or not true for the input data; and
        store or not store the logically-testable condition as a determinant for electrical power when the logically-testable condition evaluates to true or not true, respectively;
    search the knowledge base for logical rules that are triggered by the determinant; and
    generate for display the explanation or recommendation information associated with logical rules triggered by the determinant.

2. The apparatus of claim 1, wherein the processor is configured to process the input data by:
    applying a data window across a set of the input data;
    processing the windowed input data using the processing operations into the logically-testable condition; and
    determining whether the logically-testable condition is true.

3. The apparatus of claim 1, wherein the processor is further configured to:
    determine whether a load-specific profile corresponding to the determinant exists in the knowledge base; and
    revise the provided information associated with the logical rule in accordance with the load-specific profile.

4. The apparatus of claim 1, wherein the input data includes characteristic measurement data, historical data and power quality event data.

5. The apparatus of claim 4, wherein the power quality event data are generated in response to user selectable threshold conditions established at the power monitor.

6. The apparatus of claim 5, wherein the power monitor is electrically connected to different loads and the loads are known in a database.

7. The apparatus of claim 1, wherein the processor is further configured to:
    render a user interface having disposed thereon an expert analysis control that, in response to activation thereof by the user, compels the processor to perform the operations to obtain, process, determine, store, search, and generate without user activity other than activation of the expert analysis control.

8. The apparatus of claim 1, wherein the processor is further configured to perform the operations to obtain, process, determine, store, search, and generate without user activity at predetermined temporal intervals.

9. A computer-implemented method comprising:
    storing a knowledge base containing logical rules on electric power data and explanation or recommendation information associated with the logical rules;

generating for display a user interface and receive via the user interface identification of input data descriptive of electricity conveyed through at least one power monitor;
responsive to the identification, and without activity by a human user:
  obtaining the input data from the power monitor over the network;
  processing the input data in a data file format into a logically-testable condition for electrical power using predetermined processing operations;
  determining whether the logically-testable condition evaluates to true or not true for the input data; and
  storing or not storing the logically-testable condition as a determinant for electrical power when the logically-testable condition evaluates to true or not true, respectively;
  searching the knowledge base for any logical rules triggered by the determinant; and
  generating for display the explanation or recommendation information associated with logical rules triggered by the determinant.

10. The method of claim 9, wherein the processing of the input data comprises:
  applying a data window across a set of the input data;
  processing the windowed input data using the processing operations into the logically-testable condition; and
  determining whether the logically-testable condition is true.

11. The method of claim 9, further comprising:
  determining whether a load-specific profile corresponding to the determinant exists in the knowledge base; and
  revising the provided information associated with the logical rule in accordance with the load-specific profile.

12. The method of claim 9, further comprising:
  rendering a user interface having disposed thereon an expert analysis control that, in response to activation thereof by the user, compels the processor to perform the obtaining, processing, determining, storing, searching, and generating without user activity other than activation of the expert analysis control.

13. The method of claim 9, further comprising:
  performing the obtaining, processing, determining, storing, searching, and generating without user activity at predetermined temporal intervals.

14. A tangible, non-transitory computer-readable medium having encoded thereon processor instructions that, when executed by a processor, cause the processor to:
  store a knowledge base in a memory, the knowledge base containing logical rules on electric power data and explanation or recommendation information associated with the logical rules;
  generate for display a user interface and receive via the user interface identification of input data descriptive of electricity conveyed through at least one power monitor;
  responsive to the identification, and without activity by a human user:
    obtain the input data from the power monitor over the network;
    process the input data in a data file format into a logically-testable condition for electrical power using predetermined processing operations;
    determine whether the logically-testable condition evaluates to true or not true for the input data; and
    store or not store the logically-testable condition as a determinant for electrical power when the logically-testable condition evaluates to true or not true, respectively;
    search the knowledge base for any logical rules triggered by the determinant; and
    generate for display the explanation or recommendation information associated with logical rules triggered by the determinant.

15. The computer-readable medium of claim 14, further comprising processor instructions that cause the processor to:
  determine whether a load-specific profile corresponding to the determinant exists in the knowledge base; and
  revise the provided information associated with the logical rule in accordance with the load-specific profile.

16. The computer-readable medium of claim 14, further comprising processor instructions that cause the processor to:
  render a user interface having disposed thereon an expert analysis control that, in response to activation thereof by the user, compels the processor to perform the operations to obtain, process, determine, store, search, and generate without user activity other than activation of the expert analysis control.

17. The computer-readable medium of claim 14, further comprising processor instructions that cause the processor to:
  perform the operations to obtain, process, determine, store, search, and generate without user activity at predetermined temporal intervals.

18. The apparatus of claim 1, wherein the logical rules on the electric power take the form of IF-THEN pairs, symptom-cause pairs, or condition-action pairs, and the determinant serves as a basis for a knowledge base query used to perform the search of the logical rules.

19. The apparatus of claim 1, wherein the predetermined processing operations include:
  windowing to establish data windows across a user-selectable number of data items of the input data;
  statistics processing to compute statistics on a particular data window;
  mathematical processing to perform mathematical operations on the data window; and
  comparison processing to compare windowed data items to the logically-testable condition to evaluate the true or not true result.

20. The apparatus of claim 19, wherein the predetermined processing operations further include:
  trend processing to determine whether a trend exists in the data window; and
  regularity/periodicity processing to determine whether values or states appear in the data window with an identifiable regularity or are periodic.

* * * * *